US012055386B2

United States Patent
Holle et al.

(10) Patent No.: US 12,055,386 B2
(45) Date of Patent: Aug. 6, 2024

(54) METHOD AND DEVICE FOR MEASURING A TUBULAR STRAND

(71) Applicant: Sikora AG, Bremen (DE)

(72) Inventors: Armin Holle, Achim (DE); Christian Frank, Bremen (DE)

(73) Assignee: Sikora AG, Bremen (DE)

( * ) Notice: Subject to any disclaimer, the term of this patent is extended or adjusted under 35 U.S.C. 154(b) by 0 days.

(21) Appl. No.: 17/627,456

(22) PCT Filed: Jun. 20, 2020

(86) PCT No.: PCT/EP2020/065308
§ 371 (c)(1),
(2) Date: Jan. 14, 2022

(87) PCT Pub. No.: WO2021/008770
PCT Pub. Date: Jan. 21, 2021

(65) Prior Publication Data
US 2022/0268576 A1   Aug. 25, 2022

(30) Foreign Application Priority Data

Jul. 18, 2019   (DE) .................... 10 2019 119 491.1

(51) Int. Cl.
| | | |
|---|---|---|
| *G01N 21/3581* | (2014.01) | |
| *G01B 15/02* | (2006.01) | |
| *G01B 15/04* | (2006.01) | |

(52) U.S. Cl.
CPC ............ *G01B 15/02* (2013.01); *G01B 15/04* (2013.01); *G01N 21/3581* (2013.01)

(58) Field of Classification Search
CPC ........ G01B 15/02; G01B 15/04; G01B 11/06; G01N 21/3581; G01N 2021/8416;
(Continued)

(56) References Cited

U.S. PATENT DOCUMENTS

| | | | | |
|---|---|---|---|---|
| 5,928,475 A | * | 7/1999 | Chase | .................. G01N 33/343 |
| | | | | 162/DIG. 11 |
| 2014/0183365 A1 | * | 7/2014 | Kyriakis | ................. B29C 48/09 |
| | | | | 250/347 |

(Continued)

FOREIGN PATENT DOCUMENTS

| | | | | | |
|---|---|---|---|---|---|
| CN | 106767462 A | * | 5/2017 | ............. | G01B 11/06 |
| DE | 3729743 A1 | | 3/1989 | | |

(Continued)

OTHER PUBLICATIONS

PCT/EP2020/065308; International Filing Date Jun. 3, 2020; International Search Report and Written Opinion; Date of Mailing Sep. 8, 2020 (10 pages).

(Continued)

*Primary Examiner* — Kiho Kim
(74) *Attorney, Agent, or Firm* — Barclay Damon LLP (57) ABSTRACT

A device for measuring a strand that is tubular includes a first radiation source to emit terahertz radiation in a first measurement region from an inside onto an inner surface of the strand. A first radiation receiver receives terahertz radiation reflected by the strand in a second measurement region. A first evaluation apparatus determines at least one geometric parameter of the strand in the first measurement region. A second radiation source emits terahertz radiation in the second measurement region from an outside onto an outer surface of the strand. A second radiation receiver receives terahertz radiation reflected by the strand in the second measurement region. A second evaluation apparatus determines at least one geometric parameter of the strand in the second measurement region. A third evaluation apparatus determines a change in the at least one geometric parameter of the strand between the first and second measurement regions.

19 Claims, 3 Drawing Sheets

(58) Field of Classification Search
CPC ............ G01N 2021/8557; G01N 21/85; B29C 2948/92114; B29C 2948/92152; B29C 2948/9219; B29C 48/09; B29C 48/21; B29C 48/90; B29C 48/49; B29C 48/92; B29C 48/901; B29L 2023/22
See application file for complete search history.

(56) References Cited

U.S. PATENT DOCUMENTS

| 2018/0112973 | A1 | 4/2018 | Sikora | |
|---|---|---|---|---|
| 2018/0194055 | A1 | 7/2018 | Nerling | |
| 2022/0268576 | A1* | 8/2022 | Holle | B29C 48/09 |

FOREIGN PATENT DOCUMENTS

| DE | 4235163 A1 | 4/1994 |
|---|---|---|
| DE | 102015110600 B3 | 12/2016 |
| DE | 102016109087 A1 | 11/2017 |
| DE | 102017125740 A1 | 5/2019 |
| DE | 202018006144 U1 | 6/2019 |
| EP | 3480553 A1 | 5/2019 |
| JP | 1993-305647 A | 6/1995 |
| JP | 1994-190893 A | 1/1996 |
| JP | 1976-084851 A | 4/2009 |
| WO | 2015/074642 A1 | 5/2015 |
| WO | 2016/139155 A1 | 9/2016 |
| WO | 2019/086081 A1 | 5/2019 |

OTHER PUBLICATIONS

PCT/EP2020/065308; International Filing Date Jun. 3, 2020; English Translation of International Search Report and Written Opinion; Date of Mailing Sep. 8, 2020 (3 pages).
JP 2021-577655; filed Jun. 3, 2020; Notification of Reason(s) for Refusal; Dated Apr. 21, 2023 (4 pages).
JP 2021-577655; filed Jun. 3, 2020; English translation of Notification of Reason(s) for Refusal; Dated Apr. 21, 2023 (3 pages).
JP 2021-577655; filed Jun. 3, 2020; Notification of Reason(s) for Refusal; Dated Nov. 2, 2023 (3 pages).
JP 2021-577655; filed Jun. 3, 2020; English translation of Notification of Reason(s) for Refusal; Dated Nov. 2, 2023 (3 pages).
CN 202080051588.7; filed Jun. 3, 2020; Notification of First Office Action; Date of Notification Jan. 19, 2024 (15 pages).
CN 202080051588.7; filed Jun. 3, 2020; English translation of Notification of First Office Action; Date of Notification Jan. 19, 2024 (13 pages).

* cited by examiner

METHOD AND DEVICE FOR MEASURING A TUBULAR STRAND

CROSS REFERENCE TO RELATED INVENTION

This application is a national stage application pursuant to 35 U.S.C. § 371 of International Application No. PCT/EP2020/065308, filed on Jun. 3, 2020, which claims priority to, and benefit of, German Patent Application No. 10 2019 119 491.1, filed Jul. 18, 2019, the entire contents of which are hereby incorporated by reference.

FIELD OF TECHNOLOGY

The invention relates to a method and a device for measuring a tubular strand emerging from an extruder and conveyed in a longitudinal direction.

BACKGROUND

In extruders, for example plastic that is supplied granulated is melted, and the flowable plastic is discharged as a tubular strand through an annular gap. Then the tubular strand enters a calibration device with a calibration sleeve, against the inner surface of which the tubular strand is pressed for example by applying a vacuum (vacuum tank). Subsequently, the tubular strand passes through one or more cooling sections in which the outer surface of the strand is sprayed with a cooling liquid, such as for example cooling water.

It is desired to determine early on certain geometric parameters of the tubular strand such as the diameter, wall thickness or deviations from the given shape in order to correctively intervene in the extrusion process on this basis.

A method and a device for measuring the diameter and/or the wall thickness of a strand by means of terahertz radiation are known from WO 2016/139155 A. By means of a radiation transmitter, terahertz radiation is directed toward the strand to be measured, and terahertz radiation reflected by the strand is received by a radiation receiver. An evaluation apparatus can for example determine geometric parameters such as the diameter or wall thickness of the strand based on runtime measurements.

A method is known from DE 10 2016 109 087 A1 for regulating and controlling tubular extrusion systems in which the diameter, the wall thickness, any deviations in shape and the sag of the molten tube are determined at several points between the extrusion die and the subsequent calibration device, and these measured values, or respectively the data calculated therefrom, are used to regulate and control the extrusion system. For measuring, several measuring sensors are arranged distributed over the outer circumference of the molten tube in an intermediate region between the extrusion system and the calibration device.

In addition to the aforementioned measuring methods, it is also known to measure geometric parameters of a tubular strand using ultrasonic sensors.

With the method described in DE 10 2016 109 087 A1, faster intervention in controlling the extrusion system upon detecting undesirable geometric deviations is supposedly possible in that the measuring sensors measure the tubular strand from the outside after emerging from the extrusion system and before entering the calibration device. A disadvantage in the known method is however that, before entering the calibration device, the tubular strand can still deviate significantly from its specific final geometry in the calibration device. The measured values determined using the known method can therefore be fraught with corresponding imprecisions. Measuring using the known measuring method after the tubular strand emerges from the calibration device, i.e., when the tubular strand is again accessible to be measured from the outside, does in fact ensure that the measured geometric values are then closer to the final geometry of the strand. However, such regulatory interventions in the extrusion system made based on such late measured values result in significant scrap arising in the interim. Another problem of the known measuring method is the defocusing effect of the strand's outer surface. This can cause the radiation guided toward the strand's outer surface to return to the radiation sensor only with a significantly reduced signal intensity after being reflected from the strand. Particularly in the case of strands of a great wall thickness or with a strongly absorbing material, this constitutes a major problem since correspondingly large radiation absorption is associated with great wall thicknesses, or respectively strongly absorbing material.

Moreover, the extrudate between the annular gap and calibration sleeve is typically not oriented perfectly orthogonal to a sensor, particularly in the start-up phase where sagging frequently occurs. This can cause signal loss or poor measuring signals which in particular need a perpendicular radiation incidence. Even during the initial phase of strand production, the wall thickness and its distribution still change which leads to further measuring uncertainties. Moreover, the calculation of the later shape of the strand from the measurement proposed in DE 10 2016 109 087 A1 also assumes, in addition to knowledge of the temperature and exact measuring data, precise knowledge of the flow behavior. The latter can be easily modified by adding or admixing recycled material.

In DE 20 2019 102 002 U1, the measurement of a tubular strand from the inside is proposed, in particular within a calibration sleeve. In the calibration sleeve, the tubular strand is comparatively round and is also consistently aligned through the calibration sleeve, relative to the measuring device. Nevertheless, measuring from the inside of the calibration sleeve very quickly makes available measuring results for a control, or respectively regulation of the extruder so that scrap can be minimized. It is also taught that the refractive index of the strand material can be determined under these circumstances.

However, it can be difficult to establish the refractive index in some applications. Firstly, the distance between the measuring device and for example the calibration sleeve over the circumference must be determined accurately in downstream idling without a strand. This happens with the aid of the measuring device itself. This relative position must not alter during the measurement during the following strand production in order to avoid measuring errors. In practice, it can however result in a significant heating of the calibration sleeve and therefore a displacement of the center about which the measuring device rotates during the measurement, for example. Adjustable calibration sleeves also exist for the production of strands of different diameters, without having to restart the extruder. An adjustment of the inner diameter of the calibration sleeve is also carried out partially during production. These changes in dimensions naturally make it difficult to establish the refractive index.

Another problem is so-called sagging, i.e., the flowing of the still-flowable extrudate downward by gravity. The result of the sagging is that the wall thickness distribution of the finished strand is not uniform when a wall thickness discharged from the extruder is uniform over the circumference. An attempt is therefore made, predicting the sagging, to deliberately design the wall thickness distribution discharged from the extruder to not be uniform in order to achieve a wall thickness distribution which is as uniform as possible in the finished strand. However, it is difficult to predict sagging so that the described procedure is prone to errors.

On the basis of the explained prior art, the object of the invention is to provide a method and a device of the aforementioned type by means of which strand production which is reliable and minimizes scrap at all times is made possible.

BRIEF SUMMARY OF THE INVENTION

An embodiment of a method for measuring a tubular strand comprises guiding terahertz radiation in a first measurement region from at least one first radiation source from the inside onto the inner surface of the tubular strand. The terahertz radiation reflected by the tubular strand is received by at least one first radiation receiver, and at least one geometric parameter of the tubular strand is determined from the received terahertz radiation in the first measurement region. In a second measurement region located downstream of the first measurement region in the conveying direction of the strand, terahertz radiation is guided from at least one second radiation source from the outside onto the outer surface of the tubular strand. The terahertz radiation is reflected by the tubular strand and received by at least one second radiation receiver, and at least one geometric parameter of the tubular strand is determined from the received terahertz radiation in the second measurement region. A change in at least one geometric parameter of the tubular strand between the first measurement region and the second measurement region is determined, and at least one adjustment instruction for the extruder is determined based on a determined change in the at least one geometric parameter.

An embodiment of a device for measuring a tubular strand comprises at least one first radiation source configured to emit terahertz radiation in a first measurement region from the inside onto the inner surface of the tubular strand. At least one first radiation receiver is configured to receive the terahertz radiation reflected by the tubular strand in the second measurement region. A first evaluation apparatus is configured to determine at least one geometric parameter of the tubular strand in the first measurement region from the received terahertz radiation. At least one second radiation source is configured to emit terahertz radiation in a second measurement region located downstream of the first measurement region in the conveying direction of the strand from the outside onto the outer surface of the tubular strand. At least one second radiation receiver is configured to receive the terahertz radiation reflected by the tubular strand in the second measurement region. A second evaluation apparatus is configured to determine at least one geometric parameter of the tubular strand in the second measurement region from the received terahertz radiation. A third evaluation apparatus is configured to determine a change in at least one geometric parameter of the tubular strand between the first measurement region and the second measurement region, and is configured to determine at least one adjustment instruction for the extruder based on a determined change in the at least one geometric parameter.

The tubular strand measured according to the invention is an in particular hollow cylindrical, an in particular plastic, strand emerging from an extruder. The tubular strand can possess an outer diameter of more than 1 meter. This is associated with correspondingly great wall thicknesses. The invention is fundamentally based on the measuring principle already described in the prior art in which electromagnetic radiation is directed from a radiation source toward the tubular strand, and radiation reflected therefrom is received by a radiation receiver. Terahertz radiation is used. An advantage of radiation within this frequency range is that, in contrast to for example laser radiation within the visible frequency range, it is largely insensitive to external influences such as those occurring during extrusion processes. For example, based on runtime measurements, geometric parameters such as the diameter, wall thickness and/or deviations from the given, for example, circular cylindrical shape can therefore be determined in a manner known per se. To determine the wall thickness, for example, electromagnetic radiation can be used within a wavelength range for which the extruded strand is at least partially transparent.

In an embodiment, the at least one first radiation source and the at least one first radiation receiver can be formed by at least one first transceiver. Correspondingly, the at least one second radiation source and the at least one second radiation receiver can be formed by at least one second transceiver.

In an embodiment, the tubular strand is measured in two measurement regions at a distance from one another. The first measurement region is located close to the outlet of the extruder. The second measurement region is located downstream of the first measurement region in the conveying direction of the strand in a region in which the shaping of the extruded strand is at least largely concluded. In the first measurement region, a measurement is carried out from the inside and in the second measurement region from the outside. In both measurement regions, at least one geometric parameter of the tubular strand is determined by means of terahertz radiation guided toward the strand in the respective measurement region.

The measurement taking place in the first measurement region from the inside allows, as described in DE 20 2019 102 002 U1, a measurement in a region in which the outer surface of the tubular strand is covered, for example by a calibration device, and thus, on the one hand, in the immediate vicinity of the extruder and, on the other hand, with already relatively reliable shaping of the strand. Measuring from the inside also brings with it some additional advantages, including the fact that the curvature of the strand inner wall has a focusing effect on the emitted radiation and reduces the required installation space. The fact that the measurement is carried out from the outside in the second measurement region means that there is no need to provide measures in this region for introducing the measuring device into the tubular strand. At the same time, the second measurement region is arranged downstream of the first measurement region so that the outer surface of the tubular strand is accessible and is therefore available for the measurement. Due to its arrangement, the second measurement region also guarantees an already concluded shaping of the strand. For example, based on runtime measurements, geometric parameters such as for example the inner diameter, outer diameter, wall thickness and, if applicable, deviations from a given shape can be determined based on terahertz radiation emitted and reflected by boundary surfaces of the tubular strand in both measurement regions in a manner known per se.

In an embodiment, electromagnetic radiation within the frequency range of 0.001 terahertz to 6 terahertz, preferably within the frequency range of 0.02 to 3 terahertz, is referred to as terahertz radiation. The same geometric parameter is preferably determined in the first and second measurement region. For example, the (inner and/or outer) diameter and/or the wall thickness and/or deviations in shape from a given, for example circular cylindrical, shape can be determined as a geometric parameter. In the device according to the invention, a first, second and third evaluation apparatus are provided. They can be separate evaluation apparatuses or can also be formed by a common evaluation apparatus. They can also be combined with the control and/or regulating apparatus. The device according to the invention can also comprise an extruder and/or a calibration device, in particular a calibration sleeve, and/or at least one cooling section.

In the case of the invention, the measuring signals are correlated with one another in the first and second measurement region. A change in at least one geometric parameter of the tubular strand is determined between the first measurement region and the second measurement region. This is preferably the measured geometric parameter itself. However, it can also be a geometric parameter derived from the measured geometric parameter. Based on a determined change in the at least one geometric parameter, at least one adjustment instruction for the extruder is furthermore determined. The adjustment instruction can relate for example to the output of the extruder or shape of an extrusion gap. That is to say, the at least one adjustment instruction is determined based on the at least one geometric parameter of the tubular strand determined in the first measurement region and based on the at least one geometric parameter of the tubular strand determined in the second measurement region.

As already explained, the second measurement region is located downstream of the first measurement region in particular in such a way that the shaping of the tubular strand is substantially concluded. Therefore, the values determined in the second measurement region substantially reproduce the final shape of the tubular strand in a reliable manner. For example, a so-called sagging can be safely identified by a wall thickness measurement, in particular at several measuring sites distributed over the circumference of the tubular strand. It is known that sagging refers to flowing of the still-flowable extrudate downward by gravity. This regularly results in the fact that, for example, for a wall thickness discharged from the extruder which is completely uniform over the circumference, the finished tubular strand has a greater wall thickness in its lower region than in its upper region. This is counteracted in that the discharged wall thickness of the extruder is somewhat larger in the upper region than it is in the lower region. As explained above, it is however difficult to reliably predict sagging in practice. Due to the correlation according to the invention of the measuring signals from both measurement regions, it is possible to assign measuring data in the first measurement region, which are substantially obtained directly behind the extruder, to the measuring data in the second measurement region which is located further downstream. If, for example, a wall thickness of the tubular strand which is uniform over the circumference is ascertained in the second measurement region, this can be related to the corresponding measured values of a then non-uniform wall thickness distribution in the first measurement region. A rapid regulation of the extruder based on the measured values of the first measurement region identified as being advantageous can subsequently be carried out. By correlating the measuring results, the corresponding adjustment instruction can thus be determined, taking account of the measuring results in the second measurement region, in particular the change in the measuring results between the first and second measurement region and furthermore based on the measuring results in the first measurement region, therefore very quickly, while minimizing scrap.

It is also possible to utilize the determined change in the at least one geometric parameter for a production process following the current production process, in which the adjustment instruction is then determined, for example when the production parameters of the subsequent production process are unchanged in other respects.

According to an embodiment, the extruder can be controlled and/or regulated based on the at least one determined adjustment instruction. To this end, the device according to the invention has a control and/or regulating apparatus. In particular, an automatic control, or respectively regulation, and therefore a highly automated operation while minimizing errors, is possible.

According to another embodiment, the tubular strand can be located in the first measurement region in a calibration device following the extruder, in particular a calibration sleeve. Such calibration devices frequently have hollow cylindrical calibration sleeves against which the extruded strand is pressed in the still-soft state, for example by applying a vacuum (vacuum tank). On the one hand, this prevents the still-flowable strand from collapsing. On the other hand, the desired outer diameter of the strand and its outer shape are specifically dictated by the calibration sleeve. The calibration device, in particular the calibration sleeve, can directly adjoin an extruder head of the extruder. It is therefore in particular possible for there to be substantially no space between the extruder head and the calibration device. Since measurement occurs in the calibration device, in particular starting from its center, when the extruded strand passes through the calibration device, the geometry is substantially established directly after extrusion and thus, on the one hand, at an early point in time favorable for controlling, or respectively regulating. On the other hand, the tubular strand in the calibration device already has an outer geometry lying close to its final geometry.

According to a further embodiment, the second measurement region can be located downstream of a cooling section passed through by the tubular strand. In such cooling sections, conducted cooling of the tubular strand is carried out in order to obtain the final shape. In the cooling section cooling liquid such as water can for example be applied from the outside to the strand. After passing through the cooling section, the shaping, or respectively a sagging is largely concluded. The measured values supplied in the second measurement region therefore provide a particularly reliable statement about the geometry of the tubular strand. The production system for such tubular strands can comprise several cooling sections, for example three cooling sections. The second measurement region can be located for example between the first and second cooling section.

In order to minimize, or respectively exclude wavelength-dependent influences on the measurement, it can be provided in accordance with a further embodiment that the wavelength of the terahertz radiation emitted by the at least one first radiation source and the wavelength of the terahertz radiation emitted by the at least one second radiation source differ at most by a factor of 5, preferably at most by a factor of 3, more preferably at most by a factor of 1.5, even more preferably do not differ.

In accordance with a further embodiment, it can be provided that the terahertz radiation is guided from the at least one first radiation source to several measuring sites distributed over the inner circumference of the tubular strand on the inner surface of the tubular strand and/or the terahertz radiation is guided from the at least one second radiation source to several measuring sites distributed over the outer circumference of the tubular strand on the outer surface of the tubular strand.

It is in particular possible that terahertz radiation emitted by the first and/or second radiation source is guided over a measurement region of 360° onto the inner surface, or respectively the outer surface of the tubular strand. Therefore, complete capturing for example of the wall thickness distribution over the circumference of the strand is possible. It is also possible that the terahertz radiation from the at least one first radiation source having at least one first radiation transmitter rotating around the longitudinal axis of the tubular strand and arranged in the interior of the tubular strand is guided onto the inner surface of the tubular strand and/or that the terahertz radiation from the at least one second radiation source having at least one second radiation transmitter rotating around the longitudinal axis of the tubular strand and arranged outside of the tubular strand is guided onto the outer surface of the tubular strand. It is further possible that the at least one first radiation transmitter is the at least one first radiation source and/or that the at least one second radiation transmitter is the at least one second radiation source. However, it is also conceivable that the radiation transmitter is not the radiation source, but rather for example a mirror reflecting the terahertz radiation in each case. For example, it is possible that the at least one first and/or second radiation transmitter is at least one mirror rotating around the longitudinal axis of the tubular strand and irradiated by the at least one first, or respectively second radiation source. Of course, it is also conceivable that several first radiation sources and, if applicable, several first radiation receivers are provided, by means of which terahertz radiation is guided to several measuring sites distributed over the inner circumference of the tubular strand on the inner surface of the tubular strand and/or that several second radiation sources and, if applicable, also several second radiation receivers are provided, by means of which the terahertz radiation is guided to several measuring sites distributed over the outer circumference of the tubular strand on the outer surface of the tubular strand.

In accordance with a further embodiment, the wall thickness of the tubular strand can be measured at several measuring sites distributed over the circumference of the tubular strand in the first measurement region and at several measuring sites distributed over the circumference of the tubular strand in the second measurement region as at least one geometric parameter. The measuring sites in the first measurement region and the measuring sites in the second measurement region can in particular correspond to the same wall regions of the tubular strand, in particular the same circumferential regions. A temporal correlation of the measurements is also possible in such a way that the same wall regions are measured in a longitudinal direction as well. In this way, an optimum comparability of the measured values is provided. Capturing the wall thickness at several circumferential sites provides a statement about the wall thickness distribution and therefore about possible sagging. In this way, it can be examined for example whether the wall thickness in the second measurement region, that is to say after the shaping is largely concluded, is uniform over the circumference of the strand.

In accordance with a further embodiment, it can be provided that, in a first control and/or regulating operation, a control and/or regulation of the extruder based on measurement in the second measurement region is/are carried out in such a way that the measured values in the second measurement region correspond to given nominal measured values, that on reaching the nominal measured values in the second measurement region the assigned measured values in the first measurement region are determined, and that in a subsequent control and/or regulating operation a control and/or regulation of the extruder is/are carried out based on the measurement in the first measurement region in such a way that the measured values in the first measurement region correspond to the determined assigned measured values.

In this embodiment, a control and/or regulation of the extruder based on a measurement in the second measurement region is/are carried out firstly in a first control and/or regulating operation so that the tubular strand in the second measurement region possesses, after the shaping has at least been largely concluded, the given shape, for example wall thickness distribution. A soon as this is achieved, the associated measured values for example of the wall thickness distribution in the first measurement region are determined. In particular, when sagging occurs and when the wall thickness distribution in the second measurement region has the desired uniformity, the wall thickness distribution in the first measurement region will accordingly be non-uniform, as explained above. This non-uniform wall thickness distribution can then be controlled, or respectively regulated based on the measurement then (only) in the first measurement region, namely during the second control and/or regulating operation. The advantage of this procedure is that following the conclusion of the first control and/or regulating operation, a control, or respectively regulation is carried out on the basis of the measured values in the first measurement region and therefore in particular substantially directly after the strand emerges from the extruder. Thus, a particularly rapid control, or respectively regulation is carried out, minimizing scrap.

In accordance with another particularly practical embodiment, the refractive index of the tubular strand can be established from the terahertz radiation received by the at least one second radiation receiver in the second measurement region. The refractive index can be established for example as described in WO 2016/139155 A1. In particular, it is advantageous for the establishment of the refractive index if, according to a further embodiment, on a side of the tubular strand opposite the at least one second radiation source and/or opposite the at least one second radiation receiver there is provided at least one radiation reflector which reflects terahertz radiation emitted by the at least one second radiation source to the at least one second radiation receiver. In this way, it is possible to establish the refractive index based on a runtime measurement of the terahertz radiation between the radiation transmitter, or respectively radiation receiver, preferably a transceiver, and the reflector in particular by a comparison of the runtime of the terahertz radiation without a strand located in the measurement region, and the runtime with a strand located in the measurement region, given a known wall thickness, as is explained in WO 2016/139155 A1. To accomplish this, it is in principle only necessary to irradiate a wall of the strand. Only the position of the fixed reflector and the radiation transmitter must be known. Two fixed opposing reflectors could also be provided whose distance from each other is known. It is also possible to establish the refractive index of the material at various points over the circumference. With a corresponding calibration, the average temperature of the strand material can be deduced therefrom at the measuring site. Whereas for example a PIR sensor measures the surface temperature of the strand, the temperature in the strand wall could be determined in this way. Of course, the refractive index can additionally be established based on the measurement in the first region, if applicable. To this end, a metal calibration sleeve can for example serve as a reflector in a particularly simple manner.

According to another particularly advantageous embodiment, the refractive index established in the second measurement region can be used for determining the at least one geometric parameter in the first measurement region. As explained above, an establishment of the refractive index in the second measurement region when the shaping of the tubular strand is largely concluded is more reliable and more secure than in the first measurement region in which the strand material is still relatively flowable. In the aforementioned embodiment, this refractive index which is established particularly reliably is then utilized for determining the geometric parameter in the first measurement region, for example for determining the geometric wall thickness. It is assumed that the refractive index does not change between the first and second measurement region. It is known that the refractive index only depends slightly on the temperature. It is then further possible, in the event of a known temperature change of the strand between the first and second measurement region, to take account of this temperature dependency in the first measurement region when utilizing the refractive index established in the second measurement region. The temperature of the strand can be measured for example by temperature sensors provided for this purpose. In principle, a determination of the change and of the adjustment instruction could however also be carried out without taking account of the refractive index in that for example only the optical wall thicknesses in the first and second measurement region and therefore a relative change in the wall thicknesses are taken account of.

As already explained in principle, this produces a particularly reliable measurement and simple evaluation if, according to a further embodiment, it is provided that the terahertz radiation is guided from the at least one first radiation source perpendicular to the longitudinal axis of the tubular strand onto the inner surface of the tubular strand and/or that the terahertz radiation is guided from the at least one second radiation source perpendicular to the longitudinal axis of the tubular strand onto the outer surface of the tubular strand.

The at least one first radiation source and/or the at least one first radiation receiver can be arranged in the interior of the tubular strand. A supply of the at least one first radiation source and/or of the at least one first radiation receiver with electric energy, data and/or with a cooling agent can then take place for example by at least one supply line conducted from an extruder head of the extruder to the at least one first radiation source and/or the at least one first radiation receiver. However, it is also possible that the at least one first radiation source and/or the at least one first radiation receiver is/are arranged outside of the tubular strand, and that terahertz radiation emitted by the at least one first radiation source is guided through at least one radiation conductor into the interior of the tubular strand, and that the terahertz radiation reflected by the tubular strand is guided through at least one radiation conductor out of the interior of the tubular strand to the at least one first radiation receiver. The at least one radiation conductor can then for example be conducted from an extruder head of the extruder into the interior of the tubular strand.

The method according to the invention can be performed with the device according to the invention. Correspondingly, the device according to the invention can be configured to perform the method according to the invention.

BRIEF DESCRIPTION OF THE DRAWINGS

Exemplary embodiments of the invention are explained in greater detail below by figures, wherein.

Unless otherwise indicated, the same reference numbers designate the same objects in the figures.

DETAILED DESCRIPTION OF THE INVENTION

Figure 1:
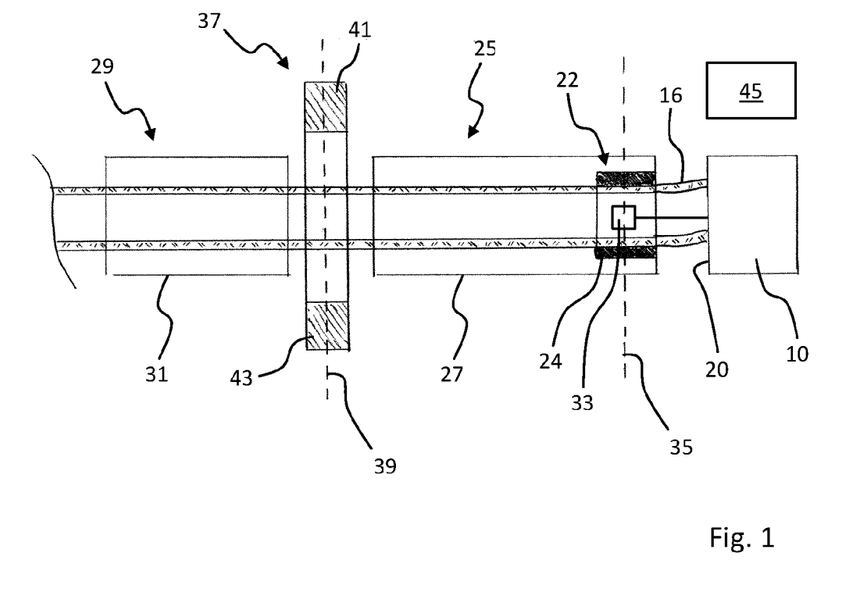
FIG. 1 illustrates a sectional view of an embodiment of a device for measuring a tubular strand.

FIG. 1 shows an extruder 10 for extruding a tubular strand 16. In a manner known per se, the extruder 10 possesses a supply 11 for supplying the plastic material to be processed, which is shown for example in FIG. 2. The plasticized plastic material is extruded by an extruder screw 12 out of an annular gap 14 into a tubular strand 16. A rotationally driven central shaft 18 runs within the extruder screw 12. In the shown example, a calibration device 22 directly adjoins the extruder head 20 and has a metal calibration sleeve 24 against which the extruded strand 16 is pressed by means of a vacuum. The reference number 25 also shows a first cooling section 25 with a first cooling tube 27 in which a conducted cooling of the tubular strand 16 is carried out in such a way that the strand 16, after emerging from the first cooling section 25, has substantially concluded its shaping. Following the first cooling section 25 is a second cooling section 29 having a second cooling tube 31, which brings about a further cooling of the strand 16. In the calibration sleeve 24 and in the interior of the extruded strand 16 there is located, in the example shown, a first measuring device 33 which forms a first measurement region 35 defined by a dashed plane in FIG. 1. For example, on the basis of runtime measurements, geometric parameters of the strand 16 in the first measurement region 35 can be determined by the first measuring device 33 such as for example the outer diameter, inner diameter and/or wall thickness, or respectively deviations in shape from a given shape. Various exemplary embodiments of the first measuring device 33 are explained below with reference to FIGS. 2 to 5. A second measuring device 37, which forms a second measurement region 39 defined by a dashed plane in FIG. 1, is also located between the first cooling section 25 and the second cooling section 29. The second measuring device 37 comprises, in the shown example, several transceivers 41, 43 arranged distributed over the circumference of the strand 16 for sending and receiving terahertz radiation guided onto the outer surface of the strand 16. For example, on the basis of runtime measurements, geometric parameters of the strand 16 in the second measurement region 39 such as for example the outer diameter, inner diameter and/or wall thickness, or respectively deviations in shape from a given shape can be determined by the second measuring device 37. The transceivers 41, 43 can measure the geometric parameters at different locations distributed over the circumference of the strand 16. For example, the transceivers 41, 43 can rotate around the strand 16 and thus determine the geometric parameters in a circumferential region of up to 360°. Based on the measurement in the second measurement region 39, the refractive index of the strand material can also be established. To this end, suitable reflectors for the terahertz radiation can be provided, for example in the region of the outer side of the second measuring device 37.

Moreover, the device according to the invention comprises a combined evaluation and regulating apparatus 45 which, on the one hand, determines the corresponding geometric parameters and, if applicable, the refractive index from the measured values of the measuring devices 33, 37 and which, on the other hand, determines a change in the measured geometric parameters between the first measurement region 35 and the second measurement region 39. Moreover, the combined evaluation and regulating apparatus 45 determines at least one adjustment instruction for the extruder 10 based on the determined change in the geometry parameters and regulates the extruder 10 based on this. That is to say, the evaluation and regulating apparatus 45 comprises the first, second and third evaluation apparatuses according to the invention as well as the control and/or regulating apparatus. For example, a regulation of the extruder 10 can be carried out based on the measurement in the second measurement region 39 in a first regulating operation in such a way that the measured values in the second measurement region 39 correspond to given nominal measured values. On reaching the nominal measured values in the second measurement region 39, the assigned measured values are determined in the first measurement region 35. In a subsequent regulating operation, a regulation of the extruder 10 is then carried out based on the measurements in the first measurement region 35 in such a way that the measured values in the first measurement region 35 (furthermore) correspond to the determined assigned measured values. The refractive index determined by the second measuring device 37 in the second measurement region 39 can also be used to establish geometric parameters by the first measuring device 33 in the first measurement region 35. Thanks to the aforementioned regulation, a sagging of the still-flowable strand material can be compensated for, for example, such that the strand 16 has a given wall thickness distribution which is as uniform as possible after concluding its shaping, in particular in the region of the second measurement region 39.

Figure 2:
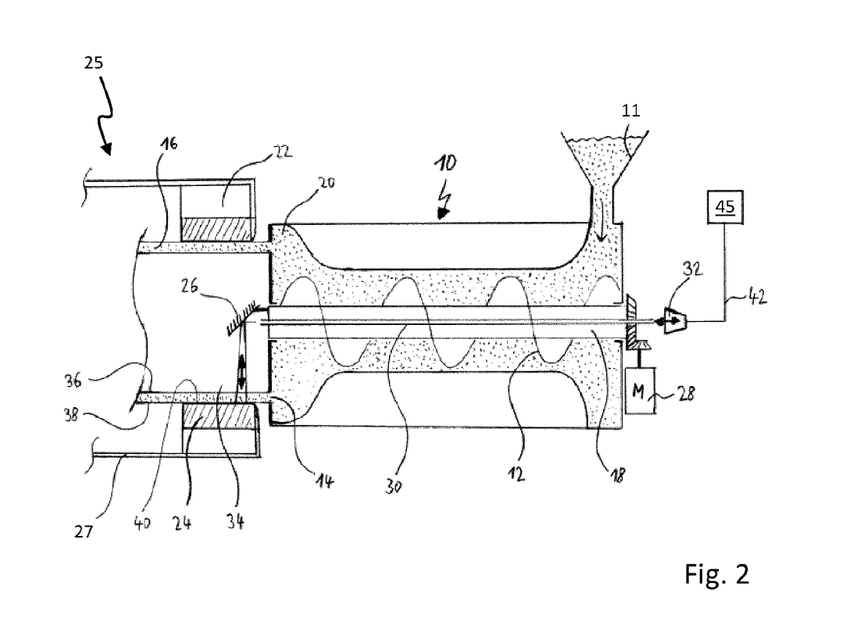
FIG. 2 illustrates a close-up view of an embodiment of a portion of the device of FIG. 1.

Different exemplary embodiments for the measurement from the inside in the first measurement region 35 are explained below. In the example shown in FIG. 2, a mirror 26 is arranged in the interior of the extruded strand 16 and substantially directly after the extruder head 20 and thus in the calibration device 22. The mirror 26 is connected to the shaft 18 that in turn is rotatably driven by a motor 28. Consequently, the mirror 26 is also rotated about the longitudinal axis of the tubular strand 16. A hollow conductor 30 also runs in the shaft 18 and guides terahertz radiation emitted by a transceiver 32 which in the shown example comprises a radiation source and a radiation receiver to the mirror 26 that deflects this radiation by 90° onto the inner surface of the strand 16 as illustrated in FIG. 2 by the reference number 34. On the one hand, the terahertz radiation is reflected by the inner surface 36 of the extruded strand 16 back to the mirror 26, and guided therefrom via the hollow conductor 30 back to the transceiver 32. An additional radiation component enters the extruded strand 16 and is reflected by the boundary surface between the outer side 38 of the strand 16 and inner surface 40 of the calibration sleeve 24, and is guided by the mirror 26 and the hollow conductor 30 back to the transceiver 32.

The measured values received by the transceiver 32 are transmitted through a line 42 to the evaluation and regulating apparatus 45. The evaluation and regulating apparatus 45 determines the inner and/or outer diameter, and/or the wall thickness, and/or any deviations in shape of the extruded strand 16, for example on the basis of runtime measurements from the measured values. The refractive index of the strand material can also be established in the above-explained manner using the radiation reflected back at the boundary surface to the metal calibration sleeve 24. Given the rotation of the mirror 26, the explained measurement can be distributed over the circumference of the tubular strand 16, for example again over a region of 360°, for a plurality of measurement regions. Based on the determined measured values, the evaluation and regulating apparatus 45 can regulate the extruder.

Figure 3:
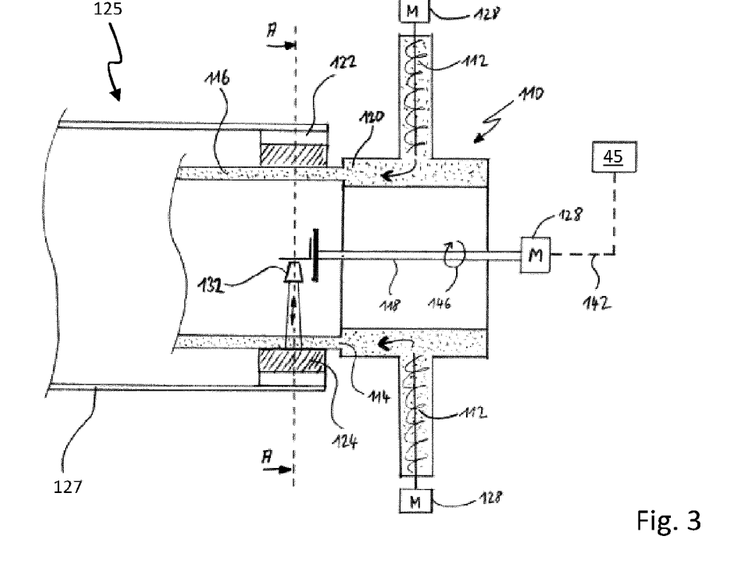
FIG. 3 illustrates a close-up view of another embodiment of a portion of the device of FIG. 1.

Another exemplary embodiment is shown in FIG. 3 that largely corresponds to the exemplary embodiment according to FIG. 2. In contrast to the exemplary embodiment in FIG. 2, an extruder 110 is shown in FIG. 3 that possesses two extruder screws 112 running perpendicular to the longitudinal axis of the annular gap 114. The extruder screws 112 are each rotatably driven by a motor 128. The supplied material is in turn discharged through the annular gap 114 to form the tubular strand 116. Directly after the extruder 110, a calibration device 122 is then provided with a metal calibration sleeve 124. Furthermore, a first cooling tube 127 of a first cooling section 125 is shown. The extruded tubular strand 116 in FIG. 3 can possess a greater diameter than the tubular strand 16 shown in FIG. 2. Correspondingly, there is more space in the interior of the strand 116 in the exemplary embodiment in FIG. 3. Therefore, a transceiver 132 is arranged in the interior of the strand in this exemplary embodiment. By means of another motor 128 as indicated in FIG. 3 by the arrow 146, the transceiver 132 is rotatably driven by a shaft 118 conducted through the extruder head 120. The transceiver 132 can for example be connected by slip ring contacts to an external electrical supply, not shown in greater detail. Through these slip ring contacts, the measured values of the transceiver 132 can, if applicable, also be transmitted to the evaluation apparatus 45 as illustrated by the dashed line 142.

Figure 4:
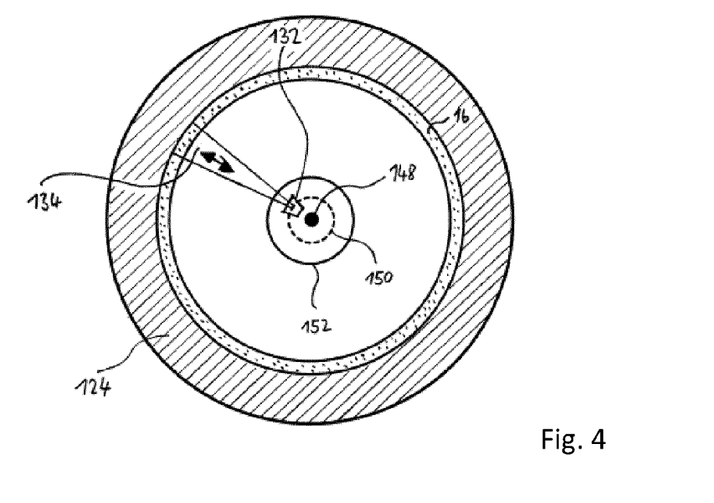
FIG. 4 illustrates a cross-sectional view along line A-A of the embodiment of FIG. 3.

The rotating transceiver 132 records measured values in principle in the same manner as described with respect to FIG. 2 so that the evaluation and regulating apparatus 45 can on this basis establish in particular the inner and/or outer diameter, the wall thickness, and any deviations in shape of the tubular strand 116. In turn, the extruder 110 can be regulated on this basis. It would also be conceivable in principle to likewise arrange the rotary drive in the interior of the tubular strand 116. FIG. 4 illustrates the radiation emitted by the transceiver 132 and reflected back with reference number 134. The center of rotation 148 and the circular path 150 of the transceiver are also shown in FIG. 4. A housing of the measuring head with the transceiver 132 is illustrated with reference number 152.

Figure 5:
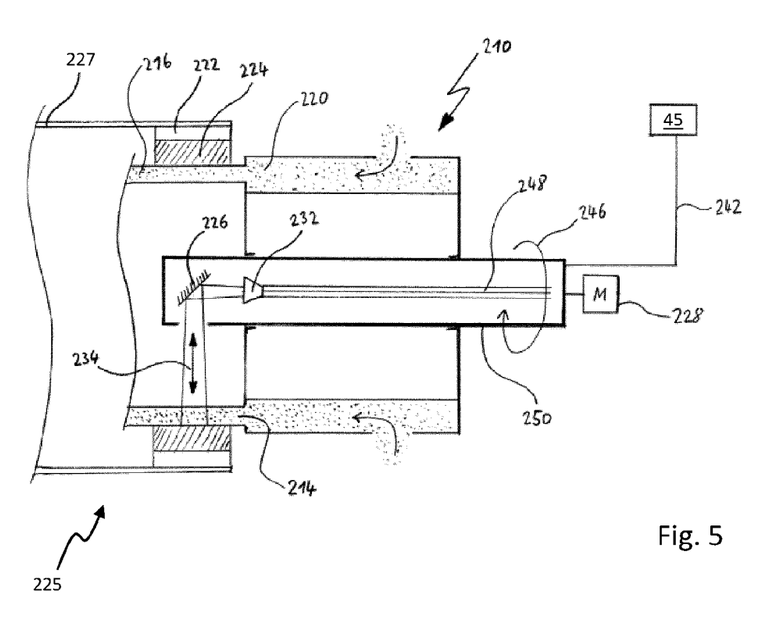
FIG. 5 illustrates a close-up view of another embodiment of a portion of the device shown in FIG. 1.

FIG. 5 shows another exemplary embodiment that again largely corresponds to the above-explained exemplary embodiments. The extruder 210 shown in FIG. 5 in turn discharges plasticized plastic material supplied by extruder screws (not shown in greater detail) through an annular gap 214 into a tubular strand 216. In turn, a calibration device 222 with a metal calibration sleeve 224 substantially directly adjoins the extruder head 220, and the strand 216 is for example pressed against it with a vacuum. Reference number 227 indicates a cooling tube of a cooling section 225. In the shown example in the interior of the strand, a mirror 226 is in turn located within the calibration device 222 that deflects terahertz radiation by 90° onto the inner surface of the strand 216 that is emitted by a transceiver 232 arranged in the extruder head 220 as illustrated at 234. By a motor shown in FIG. 5 at reference number 228, the transceiver 232 is rotated together with the mirror 226 about the longitudinal axis of the tubular strand 216 as illustrated by the arrow 246. A supply line 248 serves to electrically supply the transceiver, and to supply a coolant such as a cooling liquid.

Measured values recorded by the transceiver 232 can be supplied via the supply line 248 via a line 242 to the evaluation and regulating apparatus 45. The recording of the measured values, the evaluation by the evaluation and regulating apparatus 45, and the regulating of the extruder 210 based thereon corresponds in the exemplary embodiment shown in FIG. 5 to the aforementioned exemplary embodiments. In the exemplary embodiment according to FIG. 5, the mirror 226 and the transceiver 232 are located within a housing 250 that can be used for measuring as a plug-in in the extruder head 220. By removing the housing 250, the measuring device can be removed easily if desired.

REFERENCE NUMBERS 10, 110, 210 Extruder
11 Supply
12, 112 Extruder screw
14, 114, 214 Annular gap
16, 116, 216 Tubular strand
18, 118 Shaft
20, 120, 220 Extruder head
22, 122, 222 Calibration device
24, 124, 224 Calibration sleeve
25, 125, 225 First cooling section
26, 226 Mirror
27, 127, 227 First cooling tube
28, 128, 228 Motor
29 Second cooling section
30 Hollow conductor
31 Second cooling tube
32, 132, 232 Transceiver
33 First measuring device
34, 134, 234 Radiation
35 First measurement region
36 Inner surface of the strand
37 Second measuring device
38 Outer surface of the strand
39 Second measurement region
40 Inner surface of the calibration sleeve
41, 43 Transceiver
42, 142, 242 Line
45 Evaluation and regulating apparatus
146, 246 Arrow
148 Center of rotation
150 Circular path of the transceiver
152 Housing of the measuring head
248 Supply line
250 Housing

The invention claimed is:

1. A method for measuring a tubular strand emerging from an extruder and conveyed in a longitudinal direction, the method comprising:

guiding terahertz radiation in a first measurement region from at least one first radiation source from an inside onto an inner surface of the tubular strand;
reflecting the terahertz radiation by the tubular strand;
receiving the reflected terahertz radiation by at least one first radiation receiver;
measuring a temperature of the first and second measurement regions;
determining at least one geometric parameter of the tubular strand from the received terahertz radiation in the first measurement region,
guiding terahertz radiation in a second measurement region from at least one second radiation source from an outside onto an outer surface of the tubular strand;
reflecting the terahertz radiation by the tubular strand;
receiving the reflected terahertz radiation by at least one second radiation receiver;
determining at least one geometric parameter of the tubular strand from the received terahertz radiation in the second measurement region, wherein the second measurement region is located downstream of the first measurement region in the conveying direction of the strand;
determining a change in at least one geometric parameter of the tubular strand between the first measurement region and the second measurement region;
determining at least one adjustment instruction for the extruder based on a determined change in the at least one geometric parameter;
determining a refractive index of the tubular strand from the terahertz radiation received by the at least one second radiation receiver in the second measurement region and taking into account a difference in the temperature between the first and second measurement regions; and
using the refractive index to determine the at least one geometric parameter in the first measurement region.

2. The method according to claim 1, wherein the extruder is controlled based on the at least one determined adjustment instruction.

3. The method according to claim 1, wherein the tubular strand is located in the first measurement region in a calibration device following the extruder.

4. The method according to claim 1, wherein the second measurement region is located downstream of a cooling section passed through by the tubular strand.

5. The method according to claim 1, wherein a wavelength of the terahertz radiation emitted by the at least one first radiation source and a wavelength of the terahertz radiation emitted by the at least one second radiation source differ by at most by a factor of 5.

6. The method according to claim 1, wherein the terahertz radiation is guided from the at least one first radiation source to several measuring sites distributed over an inner circumference of the tubular strand on the inner surface of the tubular strand.

7. The method according to claim 6, wherein a thickness of the tubular strand is measured at several measuring sites distributed over the inner circumference of the tubular strand in the first measurement region, and wherein a thickness of a wall of the tubular strand is measured at several measuring sites distributed over the inner circumference of the tubular strand in the second measurement region as at least one geometric parameter.

8. The method according to claim 1, wherein the terahertz radiation is guided from the at least one second radiation source to several measuring sites distributed over an outer circumference of the tubular strand on the outer surface of the tubular strand.

9. The method according to claim 1, further comprising reflecting the terahertz radiation emitted by the at least one second radiation source to the at least one second radiation receiver by at least one radiation reflector, wherein the at least one radiation reflector is positioned in at least one of a first position and a second position, wherein the first position is on a side of the tubular strand opposite the at least one second radiation source, and wherein the second position is opposite the at least one second radiation receiver.

10. The method according to claim 1, wherein the terahertz radiation is guided from at least one of: (1) the at least one first radiation source perpendicular to a longitudinal axis of the tubular strand onto the inner surface of the tubular strand; and (2) the at least one second radiation source perpendicular to the longitudinal axis of the tubular strand onto the outer surface of the tubular strand.

11. A device for measuring a tubular strand emerging from an extruder and conveyed in a longitudinal direction, the device comprising:
    a first radiation source configured to emit terahertz radiation in a first measurement region from an inside onto an inner surface of the tubular strand;
    a first radiation receiver configured to receive terahertz radiation reflected by the tubular strand in a second measurement region;
    a first evaluation apparatus configured to determine at least one geometric parameter of the tubular strand in the first measurement region from the received terahertz radiation;
    a second radiation source configured to emit terahertz radiation in the second measurement region from an outside onto an outer surface of the tubular strand;
    a second radiation receiver configured to receive terahertz radiation reflected by the tubular strand in the second measurement region;
    a second evaluation apparatus configured to determine at least one geometric parameter of the tubular strand in the second measurement region from the received terahertz radiation;
    a third evaluation apparatus configured to determine a change in at least one geometric parameter of the tubular strand between the first measurement region and the second measurement region, and further configured to determine at least one adjustment instruction for the extruder based on a determined change in the at least one geometric parameter; and
    at least one sensor configured to measure a temperature of the first and second measurement regions,
    wherein the second measurement region is located downstream of the first measurement region in the conveying direction of the strand,
    wherein at least one of: (i) the first evaluation apparatus; (ii) the second evaluation apparatus; (iii) the third evaluation apparatus; (iv) a control apparatus; and (v) a regulating apparatus is configured to determine a refractive index of the tubular strand from the terahertz radiation and from a difference in the temperature between the first and second measurement regions,
    wherein the first evaluation apparatus is configured to use the refractive index established in the second measurement region to determine the at least one geometric parameter in the first measurement region.

12. The device according to claim 11, wherein the control apparatus is configured to control the extruder based on the at least one determined adjustment instruction.

13. The device according to claim 12, further comprising a calibration device positioned in the first measurement region.

14. The device according to claim 12, further comprising a cooling section that is passed through by the tubular strand, wherein the second measurement region is located downstream of the cooling section.

15. The device according to claim 12, wherein at least one of: (1) the first evaluation apparatus; (2) the second evaluation apparatus; (3) the third evaluation apparatus; and (4) the control apparatus is configured to determine a refractive index of the tubular strand from the terahertz radiation received by the second radiation receiver in the second measurement region.

16. The device according to claim 11, wherein a wavelength of the terahertz radiation emitted by the first radiation source and a wavelength of the terahertz radiation emitted by the second radiation source differ at most by a factor of 5.

17. The device according to claim 11, further comprising at least one radiation reflector configured to reflect terahertz radiation emitted by the second radiation source to the second radiation receiver.

18. The device according to claim 11, wherein at least one of the first radiation source and the first radiation receiver is positioned in an interior of the tubular strand.

19. The device according to claim 18, wherein at least one of the first radiation source and the first radiation receiver is positioned outside of the tubular strand, wherein terahertz radiation emitted by the first radiation source is guided through at least one radiation conductor into the interior of the tubular strand, and wherein terahertz radiation reflected by the tubular strand is guided through at least one radiation conductor out of the interior of the tubular strand to the first radiation receiver.

* * * * *

UNITED STATES PATENT AND TRADEMARK OFFICE
CERTIFICATE OF CORRECTION

| | | |
|---|---|---|
| PATENT NO. | : 12,055,386 B2 | Page 1 of 1 |
| APPLICATION NO. | : 17/627456 | |
| DATED | : August 6, 2024 | |
| INVENTOR(S) | : Armin Holle and Christian Frank | |

It is certified that error appears in the above-identified patent and that said Letters Patent is hereby corrected as shown below:

On the Title Page

Item [86], insert --Jun. 3, 2020--

Signed and Sealed this
Eighteenth Day of February, 2025

Coke Morgan Stewart
*Acting Director of the United States Patent and Trademark Office*